(12) United States Patent
Yoshigae

(10) Patent No.: US 8,427,715 B2
(45) Date of Patent: Apr. 23, 2013

(54) IMAGE READING APPARATUS AND IMAGE FORMING APPARATUS

(75) Inventor: Takahisa Yoshigae, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 441 days.

(21) Appl. No.: 12/877,449

(22) Filed: Sep. 8, 2010

(65) Prior Publication Data

US 2011/0063689 A1    Mar. 17, 2011

(30) Foreign Application Priority Data

Sep. 11, 2009   (JP) .................. 2009-210766

(51) Int. Cl.
  *H04N 1/04*   (2006.01)
  *G06F 3/12*   (2006.01)

(52) U.S. Cl.
  USPC ........................ 358/474; 358/497; 358/1.1

(58) Field of Classification Search .................. 358/1.1, 358/1.9, 1.14, 1.15, 474, 515, 521
  See application file for complete search history.

(56) References Cited

U.S. PATENT DOCUMENTS

| | | | |
|---|---|---|---|
| 2005/0254102 A1* | 11/2005 | Kagami | 358/474 |
| 2007/0242155 A1 | 10/2007 | Yoshigae | |
| 2008/0106748 A1* | 5/2008 | Tsukahara et al. | 358/1.1 |
| 2008/0204825 A1* | 8/2008 | Kitai | 358/497 |
| 2010/0177364 A1 | 7/2010 | Yoshigae | |

FOREIGN PATENT DOCUMENTS

| | | |
|---|---|---|
| JP | 3631637 | 3/2005 |
| JP | 2006-222688 | 8/2006 |
| JP | 2008-118366 | 5/2008 |
| JP | 2010-166314 | 7/2010 |

OTHER PUBLICATIONS

U.S. Appl. No. 12/877,498, filed Sep. 8, 2010, Yoshigae.

* cited by examiner

Primary Examiner — King Poon
Assistant Examiner — Ibrahim Siddo
(74) Attorney, Agent, or Firm — Oblon, Spivak, McClelland, Maier & Neustadt, L.L.P.

(57) ABSTRACT

An image reading apparatus includes: a frequency modulation unit that generates a clock whose frequency is modulated by an arbitrary modulation cycle; a modulation cycle setting unit that sets the modulation cycle; a driving unit that drives the photoelectric conversion element by the clock; a signal generating unit that generates an analog signal corresponding to a frequency change of the clock; an amplification inversion unit capable of amplifying an alternating current component of the analog signal with an amplification factor corresponding to a setting value set externally, and capable of switching between inversion and non-inversion; a signal superimposing unit that superimposes the analog image signal on an analog signal output from the amplification inversion unit; and a controlling unit that calculates a feature amount, and that controls the amplification factor and the inversion or the non-inversion of the amplification inversion unit based on a calculation result.

14 Claims, 14 Drawing Sheets

FIG. 8A  FREQUENCY CHARACTERISTICS OF DAC
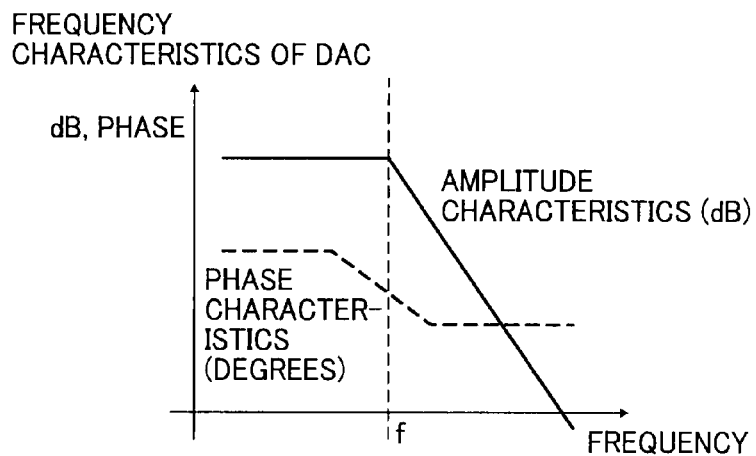
FIG. 8B  FREQUENCY CHARACTERISTICS OF Vref SUPPLYING CIRCUIT WHEN RC IS PLACED IN PARALLEL
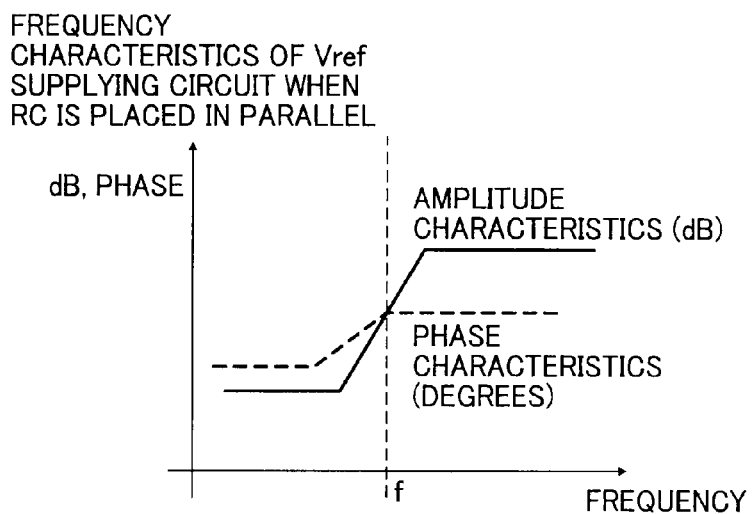
FIG. 8C  f FREQUENCY CHARACTERISTICS WHEN DAC AND Vref SUPPLYING CIRCUIT ARE COMBINED
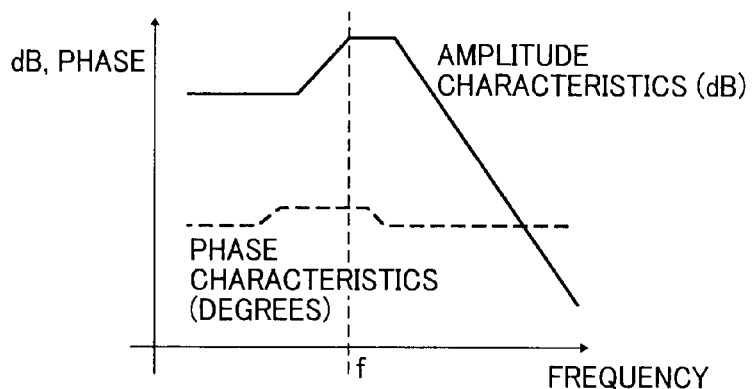

AVERAGE AROUND TARGET PIXEL

PROCESSING IS PERFORMED ON EACH PIXEL IN MAIN-SCANNING DIRECTION

IMAGE READING APPARATUS AND IMAGE FORMING APPARATUS

CROSS-REFERENCE TO RELATED APPLICATIONS

The present application claims priority to and incorporates by reference the entire contents of Japanese Patent Application No. 2009-210766 filed in Japan on Sep. 11, 2009.

BACKGROUND OF THE INVENTION

1. Field of the Invention

The present invention relates to an image reading apparatus that converts light reflected from an original into analog image signals by a photoelectric conversion element, that converts the obtained analog image signals to which analog signal processing is applied into digital image signals by an analog-digital converter, and that outputs the digital image signals, and an image forming apparatus including the image reading apparatus.

2. Description of the Related Art

In recent years, reading speed of image data is increased, and the frequency of a reading operation clock is also increased accordingly. Consequently, it is essential to take a countermeasure against electromagnetic interference (EMI) relative to the regulations on electromagnetic wave intensity (such as Federal Communications Commission (FCC) and Voluntary Control Council for Interference by Information Technology Equipment (VCCI)).

A Spread Spectrum Clock Generator (SSCG) is generally used as an effective countermeasure against the EMI. The SSCG is a method for integrally planarizing the EMI spectrum by modulating the frequency of the operation clock within a very small area at a slow cycle rate.

When the SSCG is applied to an image reading apparatus, the adverse effect of modulation of the SSCG appears on an image. When the modulation of the SSCG is applied to a drive of a charge-coupled device (CCD) used as a photoelectric conversion element and an operation clock of analog-digital conversion (A/D conversion), the offset level of an image reading signal varies in synchronization with the modulation cycle of the SSCG, however slight. Accordingly, a streak PP such as a horizontal streak or an orthogonal streak appears on the image (see FIG. 16).

To solve such a problem, for example, Japanese Patent Application Laid-open No. 2008-118366 discloses a technology by which a variation component in an image signal is removed, and horizontal streaks are prevented from appearing.

Japanese Patent Application Laid-open No. 2008-118366 discloses a variation removing circuit 112 that is included in an image reading apparatus functioning to convert incident light into analog image signals by a photoelectric conversion element 105, to digitalize the analog image signals by an analog-digital converter, and to output the signals, and that drives the photoelectric conversion element 105 by a clock whose frequency is modulated, and superimposes a signal having an opposite phase and the same variation amount as those of the analog image signals on the image signal, corresponding to a frequency change of the clock (see FIG. 17).

The variation removing circuit 112 generates a correction signal whose amplitude and phase are set in advance to be superimposed on the image signal, and superimposes the correction signal on the image signal. As an example, it is possible to change the bias current of a transistor connected in an emitter follower configuration.

However, in such a conventional technology, the amplitude and the phase of the correction signal to be superimposed on the image signal are set in advance. Accordingly, when the offset variations due to the effect of the SSCG fluctuate among devices, the conventional technology may fail to deal with the situation.

SUMMARY OF THE INVENTION

It is an object of the present invention to at least partially solve the problems in the conventional technology.

According to an aspect of the present invention, there is provided an image reading apparatus that converts light reflected from an original into an analog image signal by a photoelectric conversion element, that converts the obtained analog image signal to which analog signal processing is applied into a digital image signal by an analog-digital converter, and that outputs the digital image signal, the image reading apparatus including: a frequency modulation unit that generates a clock whose frequency is modulated by an arbitrary modulation cycle relative to a reference clock; a modulation cycle setting unit that sets the modulation cycle; a driving unit that drives the photoelectric conversion element by the clock whose frequency is modulated; a signal generating unit that generates an analog signal corresponding to a frequency change of the clock whose frequency is modulated; an amplification inversion unit capable of amplifying an alternating current component of the analog signal with an amplification factor corresponding to a setting value set externally, and capable of switching between inversion and non-inversion; a signal superimposing unit that superimposes the analog image signal on an analog signal output from the amplification inversion unit; and a controlling unit that controls to convert the analog image signal on which the analog signal is superimposed by the signal superimposing unit into a digital image signal by the analog-digital converter, that calculates a feature amount appearing on the digital image signal based on the modulation cycle set by the modulation cycle setting unit, and that controls the amplification factor and the inversion or the non-inversion of the amplification inversion unit based on a calculation result.

According to another aspect of the present invention, there is provided an image forming apparatus including the image reading apparatus mentioned above.

According to still another aspect of the present invention, there is provided an image reading apparatus that converts light reflected from an original into an analog image signal by a photoelectric conversion element, that converts the obtained analog image signal to which analog signal processing is applied into a digital image signal by an analog-digital converter, and that outputs the digital image signal, the image reading apparatus comprising: means for generating a clock whose frequency is modulated by an arbitrary modulation cycle relative to a reference clock; means for setting the modulation cycle; means for driving the photoelectric conversion element by the clock whose frequency is modulated; means for generating an analog signal corresponding to a frequency change of the clock whose frequency is modulated; means for being capable of amplifying an alternating current component of the analog signal with an amplification factor corresponding to a setting value set externally, and capable of switching between inversion and non-inversion; means for superimposing the analog image signal on an analog signal output from the amplification inversion unit; and means for controlling to convert the analog image signal on which the analog signal is superimposed by the signal superimposing unit into a digital image signal by the analog-digital converter, calculating a feature amount appearing on the digital image signal based on the modulation cycle set by the modulation cycle setting unit, and controlling the amplification factor and the inversion or the non-inversion of the amplification inversion unit based on a calculation result.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 8A to 8C are graphs for explaining the improvement of the frequency characteristics of a DAC;

DETAILED DESCRIPTION OF THE PREFERRED EMBODIMENTS

Exemplary embodiments of the present invention will be described below in greater detail with reference to the accompanying drawings.

Figure 1:
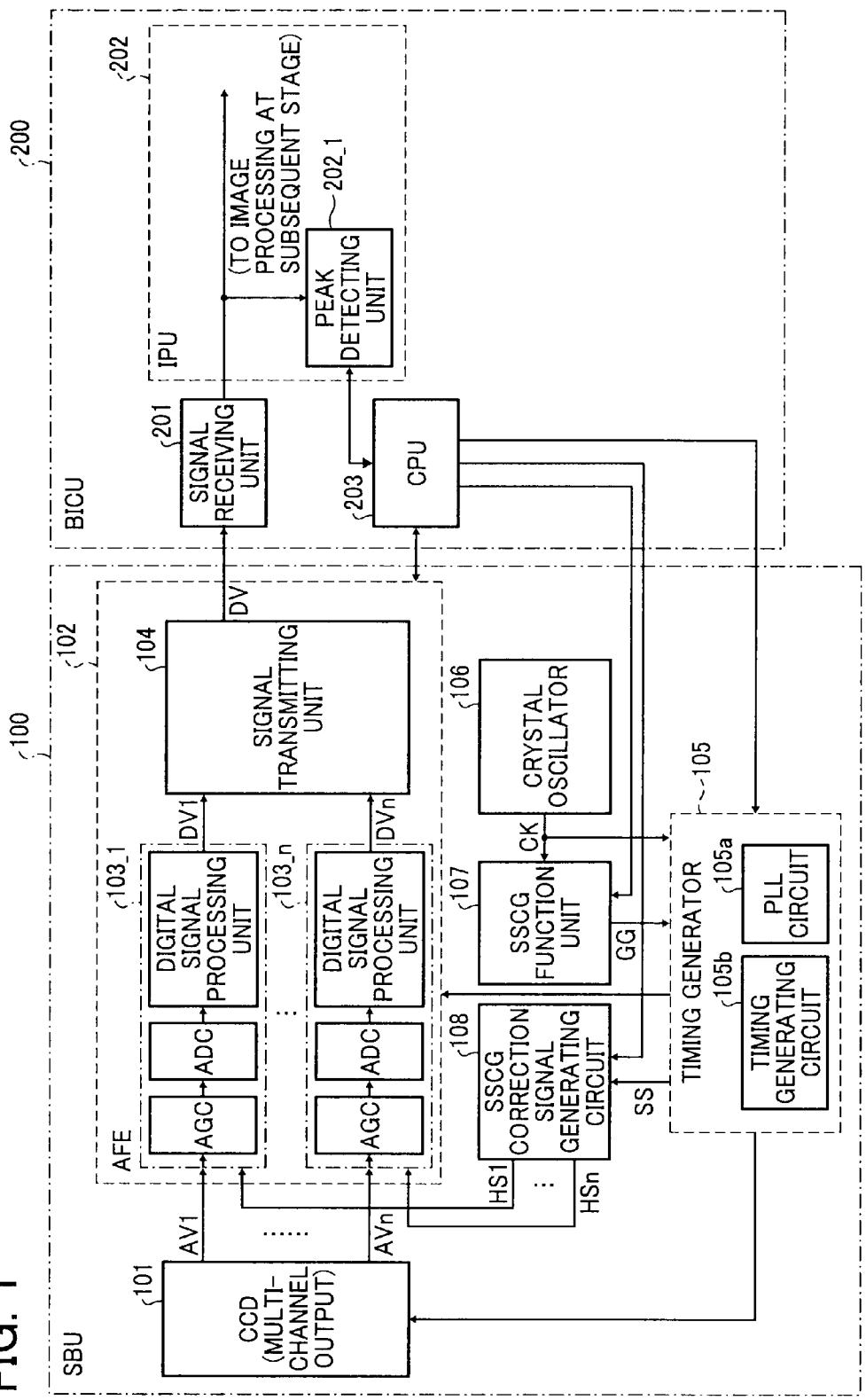
FIG. 1 is a schematic of an example of an essential portion of an image signal processing system of an image reading apparatus according to an embodiment of the present invention.

FIG. 1 is a schematic of an example of an essential portion of an image signal processing system of an image reading apparatus according to an embodiment of the present invention.

The image reading apparatus illustrated in FIG. 1 uses a so-called reduction optical system in which an original to be read is placed on a contact glass, an image surface is scanned by a scanning optical system, and the scanned image surface is converged to a CCD line image sensor 101 in a sensor board unit (SBU) 100. The CCD line image sensor 101 is divided into a plurality of (n pieces) of blocks, to read an image at high speed and the like. Image reading signals from the blocks are output from separate output channels.

Read analog image signals AV1 to AVn of n channels output from the CCD line image sensor 101 are received by analog processing units 103_1 to 103__n of n pieces in an analog front end (AFE) 102.

The analog front end 102 is an application specific integrated circuit (ASIC) for performing analog processing, analog-digital (A/D) conversion processing, and digital signal processing.

Each of the read analog image signals AV1 to AVn received by the analog processing units 103_1 to 103__n of the analog front end 102 has a difference with an internal operation reference potential (which will be described later). The difference signal is amplified with a predetermined gain by a variable gain amplifier (Auto Gain Control (AGC)) as analog image signals AR1 to ARn (not illustrated), and then converted into corresponding digital signals by an analog-digital converter (ADC). Predetermined digital processing is applied to the digital signals by a digital signal processing unit, and the processing result is output to a signal transmitting unit 104 as digital image signals DV1 to DVn.

The signal transmitting unit 104 connects the received digital image signals DV1 to DVn of n channels, and transmits to a signal receiving unit 201 of a substrate controlling unit (Base Image Control unit (BICU)) 200 at a subsequent stage, as a digital image signal DV of one continuous line.

The gains of variable gain amplifiers of the analog processing units 103_1 to 103__n can be programmably set, to absorb fluctuations of parts of a lamp in the reduction optical system described above, fluctuations of sensitivity of the CCD line image sensor 101, and the like. The gains are adjusted and a setting value is determined when the power is turned ON, or each time image data is read, so that the digital output remains constant, when the reference white level is read (so-called shading correction processing).

The digital signal processing unit performs a predetermined digital signal processing (such as gamma correction processing). A Low Voltage Differential Signaling (LVDS) transmitter is used as the signal transmitting unit 104, and for example, an LVDS receiver is used as the signal receiving unit 201.

The digital image signal DV received by the signal receiving unit 201 is output to a peak detecting unit 202_1 of an image processing unit (IPU) 202. The digital image signal DV is also output to an image processing unit at a subsequent stage, which is not illustrated.

In the sensor board unit 100, a timing generator 105 generates various timing signals, control signals, and the like for driving the CCD line image sensor 101 and the analog front end 102. The timing generator 105 includes a phase locked loop (PLL) circuit 105*a* for generating basic clock signals and the like, and a timing generating circuit 105*b* for generating control signals and the like to drive the CCD line image sensor 101 and the analog front end 102, based on the clock signals and the like (which will be described later) generated by the PLL circuit 105*a*.

A crystal oscillator 106 generates a predetermined reference clock signal CK, and the reference clock signal CK is added to the PLL circuit 105*a* of the timing generator 105 and an SSCG function unit 107. The SSCG function unit 107 forms an SSCG modulation signal GG for performing SSCG frequency modulation (hereinafter, "SSCG modulation") on the reference clock signal generated by the PLL circuit 105a of the timing generator 105. The SSCG function unit 107 outputs the SSCG modulation signal GG to the PLL circuit 105a of the timing generator 105.

Figure 2:
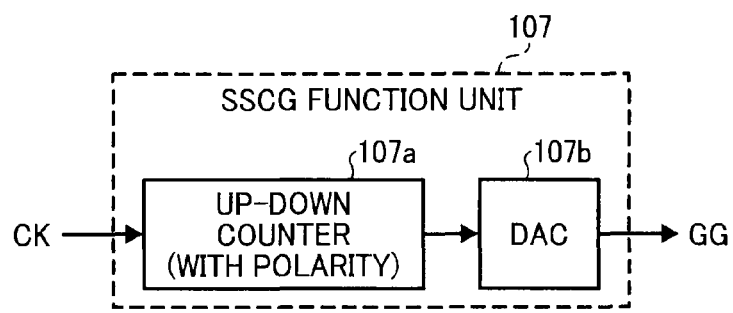
FIG. 2 is a schematic of an example of an SSCG function unit.

FIG. 2 is a schematic of the SSCG function unit 107. The SSCG function unit 107 can arbitrarily set a modulation cycle of the SSCG.

The SSCG function unit 107 includes an up-down counter 107a that calculates the reference clock signals CK received from the crystal oscillator 106 and a digital-analog converter (DAC) 107b that converts output count values from the up-down counter 107a into corresponding analog signals. The analog signal, output from the digital-analog converter 107b, is output to the PLL circuit 105a of the timing generator 105 as the SSCG modulation signal GG.

The up-down counter 107a can count both in a positive direction and a negative direction while setting the most significant bit as a polarity bit. The number of counts: N_ss of the reference clock signals CK, fed into the SSCG function portion is set in advance as a modulation cycle, for example, by a central processing unit (CPU) 203. The number of counts: N_ss is a value of a variable T_1 indicating one cycle of the SSCG modulation cycle. If the cycle of the reference clock signal CK is multiplied by the number of counts: N_ss, the time of one cycle of the SSCG modulation cycle can be calculated. By providing a register that stores therein a value of the number of counts: N_ss and that can be accessed externally in the up-down counter 107a, for example, the CPU 203 can set the SSCG modulation cycle to an arbitrary time.

An operation performed by the SSCG function unit 107 will now be described. If the SSCG function starts being used, the SSCG function unit 107 starts operating. In synchronization with the reference clock signals CK, the up-down counter 107a counts up the reference clock signals CK by one step from the initial value: "0". When the count value reaches N_ss/4, the up-down counter 107a stops counting up the reference clock signals CK, and starts counting down in synchronization with the reference clock signals CK. When the count value reaches −N_ss/4, the counting operation performed by the up-down counter 107a is switched to counting up from counting down. Hereinafter, the up-down counter 107a repeats the counting operation described above.

In this manner, the up-down counter 107a starts counting the reference signals from zero, and counts up to N_ss/4. Upon reaching N_ss/4, the up-down counter 107a starts counting down the reference signals to −N_ss/4, and then counts up to N_ss/4. Hereinafter, the counting operation is repeatedly performed.

Figure 3:
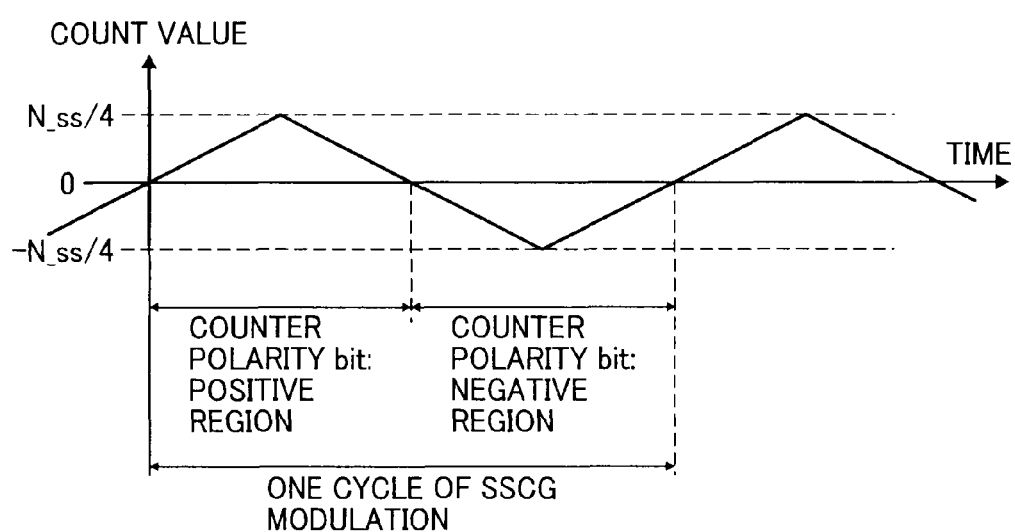
FIG. 3 is a waveform chart for explaining an operation performed by an up-down counter 107*a*.

Accordingly, as illustrated in FIG. 3, the count value of the up-down counter 107a changes periodically from N_ss/4 to −N_ss/4 based on the received reference clock signals CK. The changing cycle corresponds to one cycle of the SSCG modulation. In this manner, the waveform of the SSCG modulation signal GG output from the digital-analog converter 107b becomes a triangular waveform that changes periodically in one cycle of the SSCG modulation.

The up-down counter 107a described above is used as the SSCG function unit 107. However, the other structure may also be used, as long as the SSCG function unit outputs an analog signal of a triangular waveform as illustrated in FIG. 3, as the SSCG modulation signal GG.

In the present embodiment, the PLL circuit 105a has a structure (which will be described later) of outputting a clock whose frequency is modulated by the SSCG modulation as a countermeasure against the EMI, based on the SSCG modulation signal GG output from the SSCG function unit 107. Accordingly, SSCG modulation is applied to all the drive signals generated by the timing generator 105. The effect of the modulation by the SSCG leads to offset variation of image data (image signal) as described above.

Accordingly, in the present embodiment, the variation is reduced by superimposing a signal with reverse phase on the image signal, relative to the offset variation of the image signal due to the effect of the SSCG modulation described above (see FIG. 13).

The method disclosed in Japanese Patent No. 2008-118366, as described above, is a method in which the amplitude of a correction signal with reverse phase is set in advance. Accordingly, the individual fluctuation of the offset variation amount cannot be adjusted.

Consequently, in the present embodiment, the DAC is used in a portion where the correction signals are generated. As a result, it is possible to perform adjustment so that individual fluctuations can be absorbed and to switch the polarity of the correction signal.

As illustrated in FIG. 1, because the output from the CCD line image sensor 101 is multi-channel (generally, six channels or 12 channels in a color CCD line image sensor), the variation amount due to the effect of the SSCG modulation fluctuate among channels. Accordingly, each channel must be corrected separately. Consequently, in the present embodiment, the variations caused by the effect of the SSCG modulation of the channels can be separately corrected, by using a general DAC with multi-channel outputs as the DAC (which will be described later).

However, in general, input-output response characteristics of the general DAC are slow, although it is inexpensive and readily available. In the present embodiment, the slow input-output characteristics of the general DAC described above are compensated, by giving a frequency characteristic to a peripheral circuit portion used for operating the DAC. Accordingly, variation due to the effect of the SSCG modulation can be corrected, without using an expensive high-speed operating DAC (which will be descried later).

As one of the characteristics of the general DAC, the setting value and an output voltage have a linear relation. In the present embodiment, a setting value used for correcting streaks due to the effect of the SSCG is calculated, by an algorithm using the linearity (which will be described later).

Referring back to FIG. 1, an SSCG correction signal generating circuit 108 generates correction signals HS1 to HSn for correcting the read analog image signals AV1 to AVn based on signals output from the timing generator 105, to remove the effect of the SSCG modulation from the read analog image signals AV1 to AVn. The SSCG correction signal generating circuit 108 outputs the correction signals HS1 to HSn to the analog processing units 103_1 to 103_n of the analog front end 102.

In the substrate controlling unit 200, the peak detecting unit 202_1 detects a peak-bottom difference signal that indicates the difference between a peak value and a bottom value of a digital image signal DV to be fed, and detects the peak-bottom difference signal in each channel of the read analog image signals AV1 to AVn. The peak detecting unit 202_1 outputs the detection value to the CPU 203 of the substrate controlling unit 200.

The CPU 203 controls the operation performed by the substrate controlling unit 200 and operations performed by the elements of the sensor board unit 100. More specifically, the CPU 203 controls the operations performed by the timing generator 105 and the analog front end 102. As to the generation of SSCG correction signals, the CPU 203 controls the operation performed by the SSCG correction signal generating unit 108, based on the peak-bottom difference signal of each channel received from the peak detecting unit 202_1. As described above, the CPU 203 also controls the operation performed by the SSCG function unit 107, and sets the number of counts: N_ss. The CPU 203 also performs setting so that the peak detecting unit 202_1 can detect a peak-bottom difference.

Figure 4:
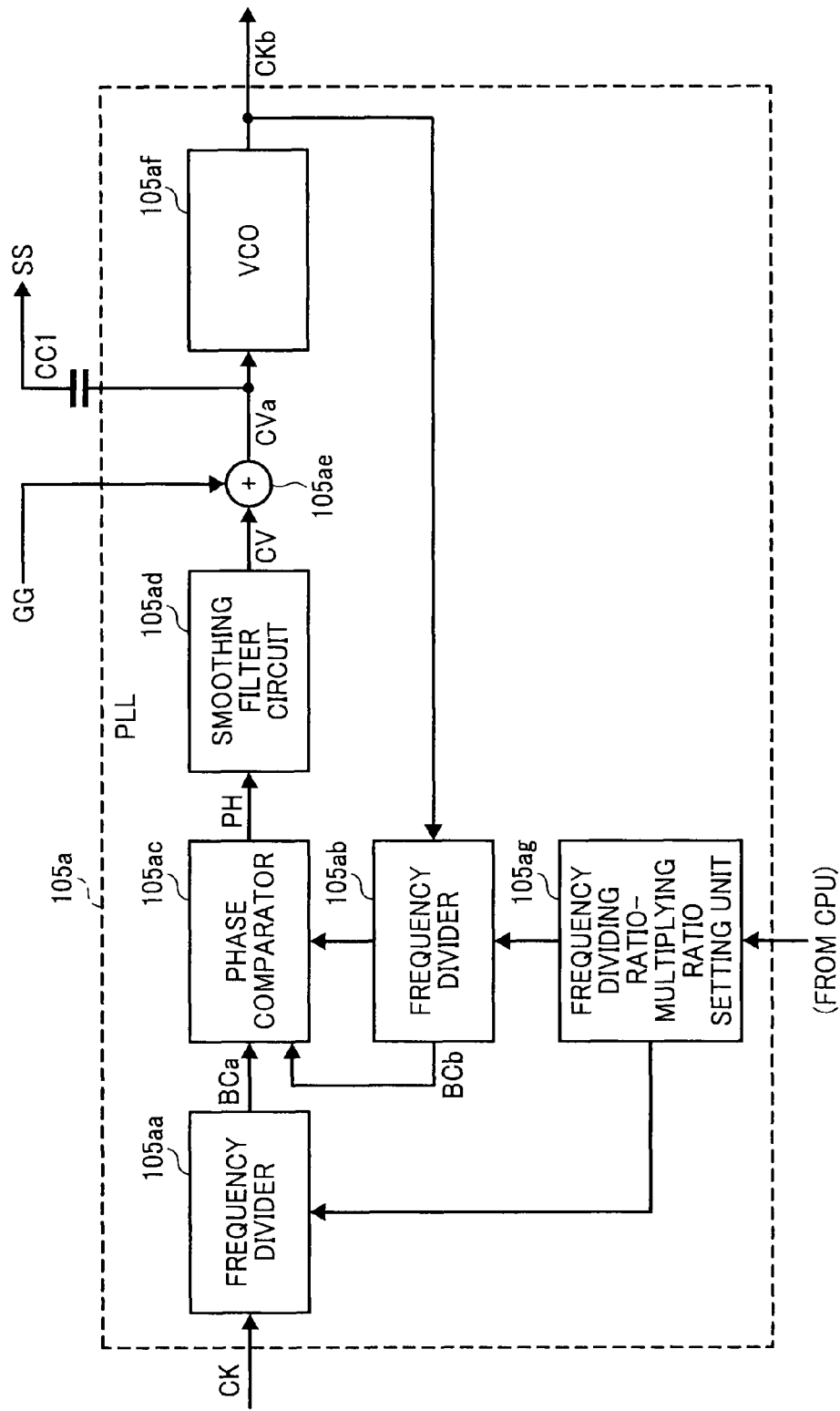
FIG. 4 is a schematic of an example of a PLL circuit.

FIG. 4 is a schematic of the PLL circuit 105a included in the timing generator 105.

As illustrated in FIG. 4, the PLL circuit 105a of the present embodiment can set the frequency dividing ratio and the multiplying ratio externally.

In the PLL circuit 105a, a signal BCa obtained by frequency dividing a clock signal CK received from the crystal oscillator 106 by a frequency divider 105aa and a signal BCb obtained by frequency dividing an inner clock signal CKb output from a voltage controlled oscillator (VCO) 105af, which will be described later, by a frequency divider 105ab, are fed into a phase comparator 105ac. The phase comparator 105ac performs phase comparison between the signal BCa and the signal BCb, and changes the duty of a pulse PH being output based on the phase comparison result.

A smoothing filter circuit 105ad receives the pulse PH, integrates the pulse PH, and converts the pulse PH into a voltage signal CV depending on the duty of the pulse PH. In other words, the smoothing filter circuit 105ad acts as a frequency-voltage converting unit that converts the pulse PH into the voltage signal CV.

The signal BCb fed back to the input of the phase comparator 105ac is a signal formed by frequency dividing the inner clock signal CKb (which will be described later) to which SSCG modulation is applied, by the frequency divider 105ab. Accordingly, the SSCG modulation is also applied to the signal BCb. As a result, the duty of the output pulse PH of the phase comparator 105ac is changed in synchronization with the phase of the SSCG modulation. The voltage signal CV output from the smoothing filter circuit 105ad is turned into an average level voltage, by setting the frequency of the response time constant of the smoothing filter circuit 105ad larger than the modulation frequency of the SSCG modulation.

The voltage signal CV is added to one input end of an adder 105ae. The SSCG modulation signal GG output from the SSCG function unit 107 is added to the other input end of the adder 105ae. The adder 105ae forms a voltage signal CVa obtained by superimposing the SSCG modulation signal GG on the voltage signal CV, and the VCO 105af receives the voltage signal CVa. The VCO 105af outputs a pulse with frequency corresponding to the received voltage CVa. The output pulse of the VCO 105af is output to external equipment as the inner clock signal CKb, and fed back to the frequency divider 105ab.

The SSCG modulation signal GG is superimposed on the voltage signal CVa fed into the VCO 105af. Accordingly, the inner clock signal CKb output from the VCO 105af is a clock signal to which the SSCG modulation is applied.

The frequency dividing ratio and the multiplying ratio of the frequency dividers 105aa and 105ab are set by a frequency dividing ratio-multiplying ratio setting unit 105ag controlled by the CPU 203.

Only an alternating current component of the voltage signal CVa fed into the VCO 105af is output to the SSCG correction signal generating circuit 108 through an alternating current coupling capacitor CC1, as an analog signal SS.

In the structure of the PLL circuit 105a, the voltage signal CVa fed into the VCO 105af is turned into a voltage signal that varies in synchronization with the modulation cycle of the SSCG modulation. By extracting the voltage signal through the alternating current coupling capacitor CC1, a signal only includes an alternating current component from which a direct current component is removed. The signal is then used as the analog signal SS in synchronization with the SSCG modulation cycle.

Figure 5:
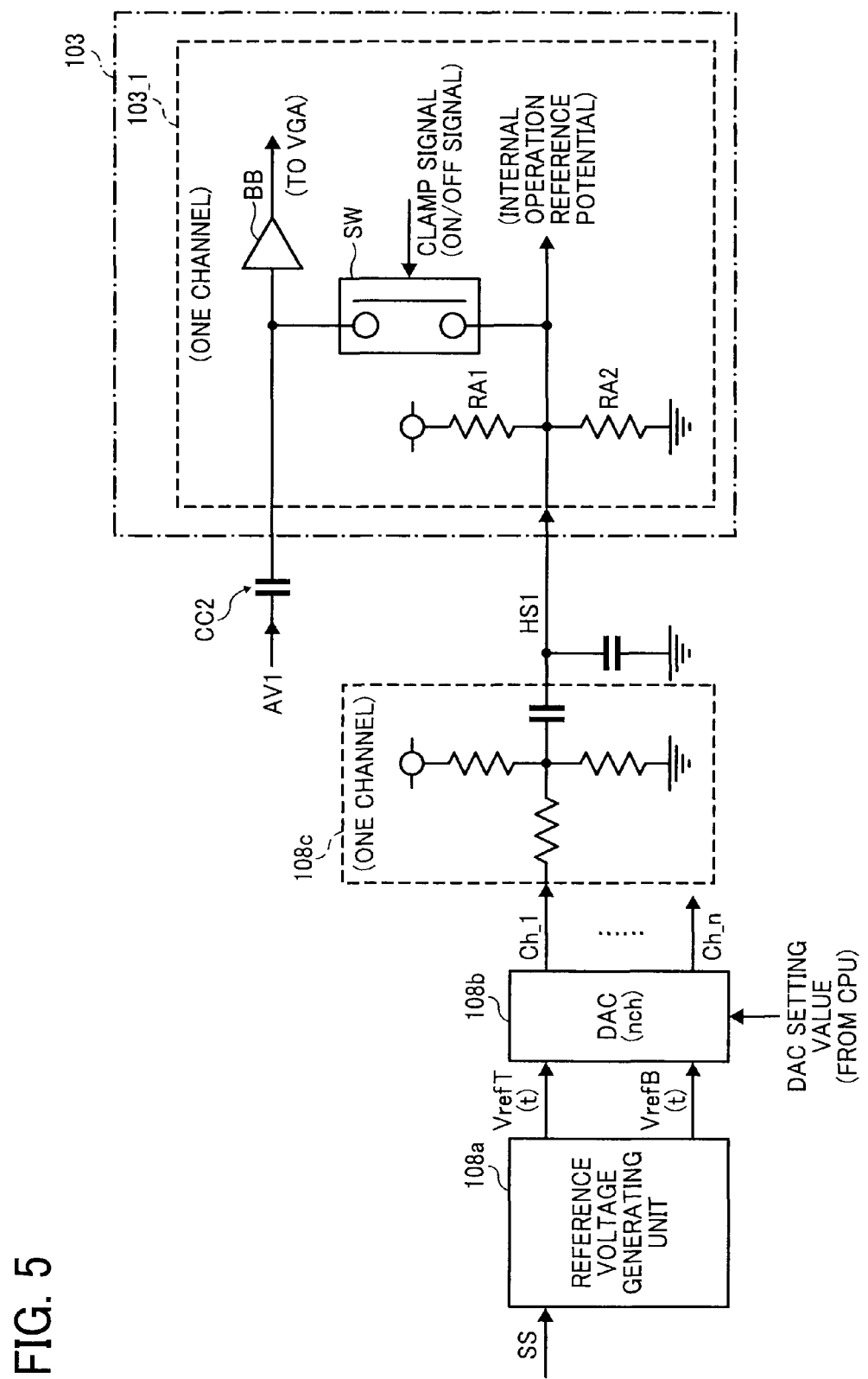
FIG. 5 is a schematic of an example of an SSCG correction signal generating circuit.

The SSCG correction signal generating circuit 108 for generating the correction signals HS1 to HSn will now be described. FIG. 5 is a schematic of an example of the SSCG correction signal generating circuit 108.

The SSCG correction signal generating circuit 108 includes a reference voltage generating unit 108a, a digital-analog converter (DAC) 108b, and an output circuit 108c. The reference voltage generating unit 108a forms reference potentials VrefT(t) and VrefB(t) of the DAC 108b having a plurality of output channels, based on the analog signal SS described above. The DAC 108b includes the output channels and outputs analog signals corresponding to the DAC setting values of the channels received from the reference potentials VrefT(t) and VrefB(t) and the CPU 203, to the channels. The output circuit 108c outputs the output signals from the channels of the DAC 108b to the device at a subsequent stage. A general DAC device can be used as the DAC 108b.

The DAC 108b sets the signal levels of the analog signals output from the channels, corresponding to the digital signals fed into the channels, based on the reference potentials VrefT(t) and VrefB(t) to be fed. The reference potential VrefT(t) indicates a reference value of the analog signal level in which the DAC setting value corresponds to the maximum value (255 at 8 bits). The reference potential VrefB(t) indicates a reference value of the analog signal level in which the DAC setting value corresponds to the minimum value (0 at 8 bits).

In the present embodiment, in the SSCG correction signal generating circuit 108, the DAC 108b having the same number of channels as that of the CCD line image sensor 101 is used as a generating unit of correction signals. Accordingly, correction signals generated corresponding to the channels of the CCD line image sensor 101 can be amplified with any amplification factor, and switching of correction signals between inversion and non-inversion are also possible (details will be described later).

An output signal from each of the channels of the DAC 108b is fed into a clamp potential input end for setting the internal operation reference potential of the analog processing units 103_1 to 103_n of the channel corresponding to the analog front end 102 through the output circuit 108c, as a correction signal HS1.

Accordingly, by setting the DAC setting value fed into the DAC 108b, so as to have the same amplitude and reversed phases as those of the offset variation of the read analog image signals AV1 to AVn generated due to the effect of the SSCG, the offset variation of the read analog image signals AV1 to AVn can be cancelled out. Consequently, it is possible to correct the offset variation of the read analog image signals AV1 to AVn generated due to the effect of the SSCG (details will be described later).

Voltage-divided resistances RA1 and RA2 for setting a clamp potential are provided in the analog processing units 103_1 to 103_n. A voltage-divided value of the voltage-divided resistances RA1 and RA2 is supplied to an inner circuit of the analog processing units 103_1 to 103_n, as an internal operation reference potential.

As the output signals from the channels (correction signals HS1 to HSn) of the DAC 108b described above, the voltage supplied to the clamp potential input end of the analog processing units 103_1 to 103_n externally acts as a superimposed potential component for displacing the internal operation reference potential.

The analog processing unit 103_1 receives a read analog image signal AV1 of a corresponding channel through an alternating current coupling capacitor CC2, and the input signal is fed into the analog processing unit 103_1 through a buffer amplifier BB. The clamp potential input end is also connected to an input end of the buffer amplifier BB, through a clamp switch SW.

Figure 6:
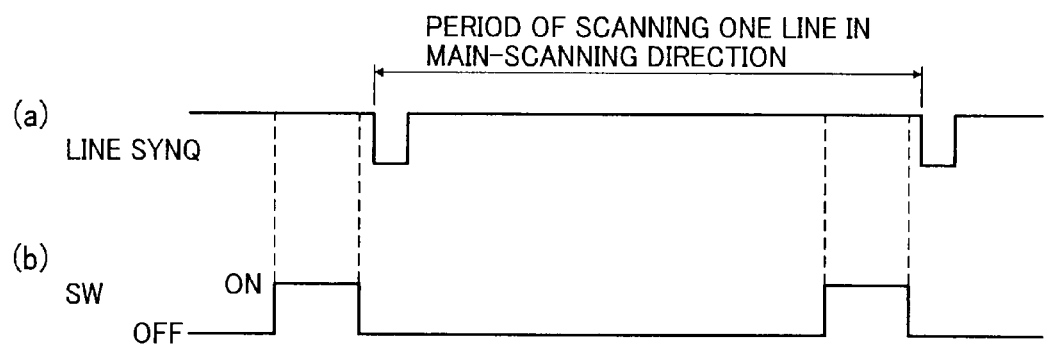
FIG. 6 is a timing chart for explaining an operation of superimposing a correction signal on an internal operation reference potential of an AFE.

As illustrated in (a) and (b) of FIG. 6, the clamp switch SW is turned on for a predetermined period of time by a clamp signal, to detect a black level reference value while one line is scanned in the main-scanning direction. Accordingly, the voltage at the input end of the buffer amplifier BB is stored in the analog processing unit 103_1 as a black level reference value.

While one line is scanned in the main-scanning direction after the clamp switch SW is turned off, the black level reference value detected by a black level reference value detecting unit is used in the analog processing unit 103_1 as a black level reference value of the read analog image signal AV1.

In other words, in the analog processing units 103_1 to 103_n, a correction signal (output signal from each of the channels of the DAC 108b) is superimposed on the clamp potential input end. Accordingly, the correction signal is superimposed on the internal operation reference potential. In the analog processing units 103_1 to 103_n, difference signals between the internal operation reference potential and the received read analog image signals AV are formed as analog image signals AR1 to ARn (not illustrated). The analog image signals AR1 to ARn are converted into the digital image signal DV by the ADC, after being amplified with the analog gain by the AGC.

In this manner, the analog image signals AR1 to ARn processed by the analog processing units 103_1 to 103_n are difference signals between the internal operation reference potential and the read analog image signal AV. Accordingly, when the correction signal is superimposed on the internal operation reference potential as described above, the difference between the internal operation reference potential and the read analog image signal AV is varied, based on the signal component of the superimposed correction signal. As a result, the similar effect as when the correction signal is superimposed on the read analog image signal AV is exerted on the analog image signals AR (AR1 to ARn). Consequently, the analog image signal AR is a signal in which the offset variation of the read analog image signal AV is corrected. As a result, the analog image signal AR can remove the effect of the SSCG modulation.

Referring back to FIG. 5, the reference voltage generating unit 108a generates reference potentials (VrefT(t) and VrefB(t)) of the DAC 108b from the analog signal SS output from the PLL circuit 105a of the timing generator 105, and supplies the reference potentials (VrefT(t) and VrefB(t)) to the DAC 108b. At this time, as illustrated in FIG. 7, the alternating current components of the reference potential VrefT(t) and the reference potential VrefB(t) are generated as signals having the same amplitude and reversed phases.

Figure 7:
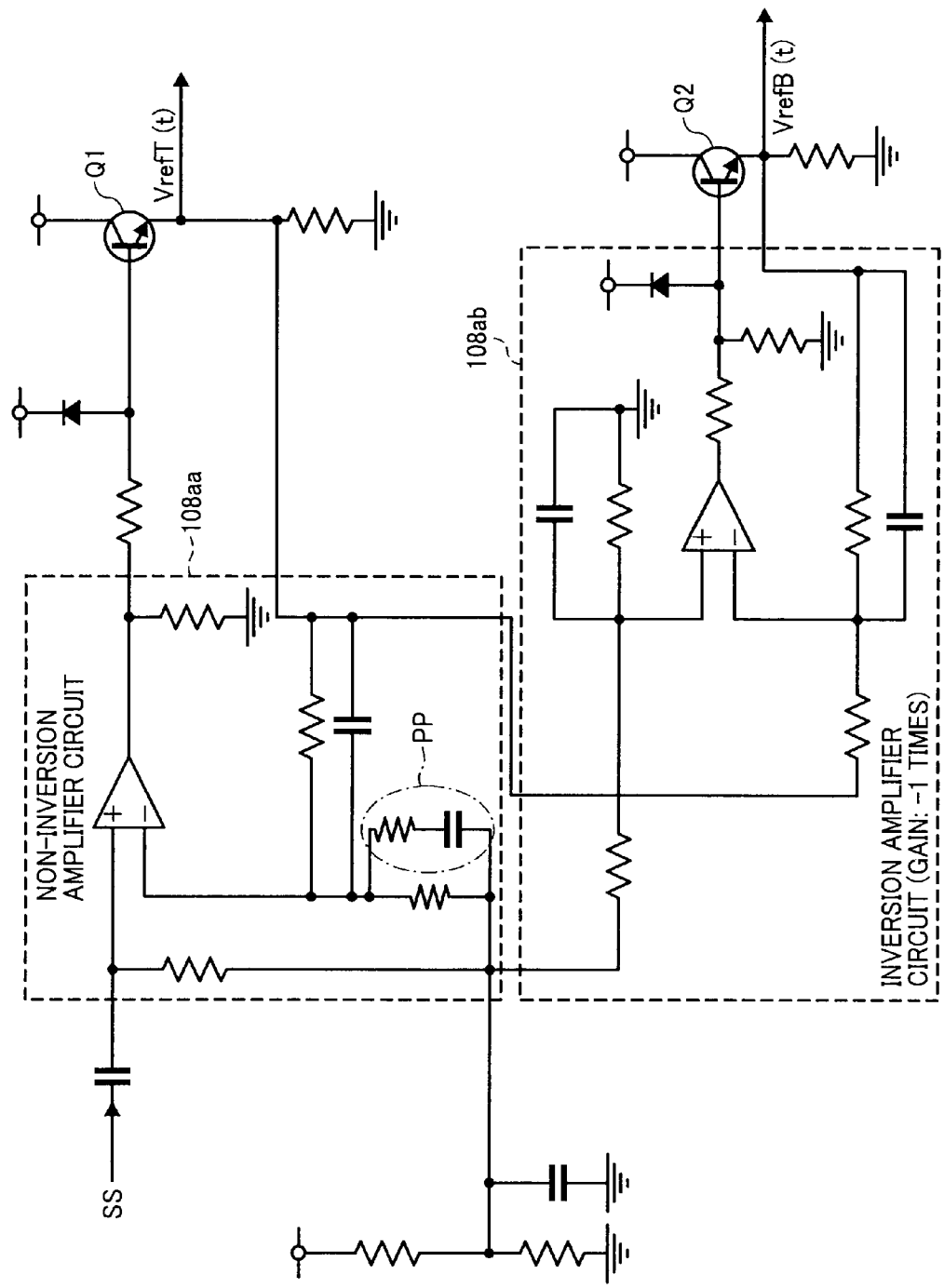
FIG. 7 is a circuit diagram of an example of a reference voltage generating unit.

FIG. 7 is a circuit diagram of an example of the reference voltage generating unit 108a.

In other words, in the reference voltage generating unit 108a, the analog signal SS extracted from the PLL circuit 105a has a very small amplitude. Accordingly, the analog signal SS is amplified by a non-inversion amplifier circuit 108aa and an inversion amplifier circuit 108ab, and is supplied as the reference potentials (VrefT(t) and VrefB(t)) of the DAC 108b.

The non-inversion amplifier circuit 108aa is an amplifier circuit with fixed gain using an operational amplifier. A phase compensation circuit PP (which will be described later) formed of a series circuit of a resistance R and a capacitor C is connected in parallel with a resistance for determining the amplification factor of the gain. An output signal of the non-inversion amplifier circuit 108aa is output to the DAC 108b as the reference potentials VrefT(t), in a state on which a predetermined offset voltage (fixed value) is superimposed through a transistor emitter follower circuit Q1.

An output voltage of the non-inversion amplifier circuit 108aa is inverted and amplified by the inversion amplifier circuit 108ab in which the gain is set to (−1) times. The output signal of the inversion amplifier circuit 108ab is output to the DAC 108b, as the reference potential VrefB(t), in a state on which a predetermined offset voltage (fixed value) is superimposed through a transistor emitter follower circuit Q2. The inversion amplifier circuit 108ab is also an amplifier circuit with fixed gain (gain: −1 times) using an operational amplifier.

In other words, the reference voltage generating unit 108a amplifies an analog signal SS extracted from the timing generator 105 using the non-inversion amplifier circuit 108aa at a certain fixed gain, and supplies the signal obtained by superimposing an offset voltage on the analog signal amplified by the non-inversion amplifier circuit 108aa to the DAC 108b, as the reference potential (reference voltage) VrefT(t).

The signal obtained by superimposing an offset voltage on a signal whose phase is obtained by inverting the phase of a signal of the reference potential VrefT(t) by the inversion amplifier circuit 108ab, is supplied to the DAC 108b as the reference potential VrefB(t). Here, the phase is inverted by an inversion amplifier circuit in which the gain of an operational amplifier is (−1) times.

In this manner, signals having the same phase and the reversed phases as that of the alternating current signal (analog signal SS) that varies in synchronization with the cycle of the SSCG modulation are fed into the VrefT(t) and VrefB(t) that are the reference voltages of the DAC 108b. When the CPU 203 performs the DAC setting (to set a digital input value applied to the DAC 108b), it is possible to obtain a correction signal with arbitrary amplitude in synchronization with the modulation cycle of the SSCG.

The correction signal will now be described.

Output voltage from the DAC 108b is expressed by Equation (I):

$$Vdac\_out(t) = (VrefT(t) - VrefB(t)) \times Dac\_set/FullScale + VrefB(t) \quad (I)$$

Dac_set: setting value for the DAC (0 to 255 at 8 bits)
FullScale: full scale value of the DAC (255 at 8 bits)
VrefT(t): upper reference potential of the DAC
VrefB(t): lower reference potential of the DAC
α(t): analog signal (alternating current signal) SS extracted from the PLL portion after being amplified
Vdac_out(t): DAC output The alternating current components of the two reference potentials have the same amplitude but reversed phases.

$$VrefT(t) = VrefT\_dc + \alpha(t)$$

$$VrefB(t) = VrefB\_dc - \alpha(t)$$

*VrefT_dc and VrefB_dc are direct current components
Accordingly, Equation (I) is expressed as follows:

Vdac_out($t$)=($\alpha$($t$)+$\alpha$($t$))×Dac_set/FullScale−$\alpha$($t$)+
(VrefT_dc−VrefB_dc)×Dac_set/FullScale+Vref-
B_dc The alternating current component (Vdac_out(t)_AC) of a signal Vdac_out(t) in the first term of the right-hand side of this Equation indicates that the amplitude and polarity can be set by the DAC setting value of the DAC 108$b$.

Vdac_out($t$)_AC=2$\alpha$($t$)×Dac_set/FullScale−$\alpha$($t$)=(2×Dac_set/FullScale−1)×$\alpha$($t$)

For example, when the DAC 108$b$ is set at 8 bits,

At Set:255, Vdac_out($t$)_AC=$\alpha$($t$)

At Set:128, Vdac_out(t)_AC≅0

At Set:0, Vdac_out($t$)_AC=−$\alpha$($t$)

Accordingly, arbitrary setting and switching between inversion and non-inversion are possible.

At this time, the size of the variation: $\Delta$ per step of the DAC 108$b$ is expressed by $|\Delta|=\alpha(t)/128$. Accordingly, it is proved that the size of the variation $\Delta$ has a linear characteristic that is proportionally changed relative to the DAC setting value for $\alpha$($t$) of the input signal.

If a general DAC device with multi-channels for setting a DAC setting value through serial communication is used as the DAC 108$b$, the phase of the correction signal obtained as an output signal of the DAC 108$b$ is delayed because the response characteristics of the output change relative to the change of the reference potentials VrefT(t) and VrefB(t) is slow.

Accordingly, in a portion of the reference voltage generating unit 108$a$ that generates the reference potentials VrefT(t) and VrefB(t) for the DAC 108$b$, the slow response characteristic of the DAC 108$b$ is compensated by increasing the amplification factor of the high-frequency component and giving a frequency characteristic so as to advance the phase.

In the present embodiment, in the non-inversion amplifier circuit 108$aa$ illustrated in FIG. 7, the amplification factor of the high-frequency component is increased by connecting the phase compensation circuit PP in parallel with the resistance portion for determining the amplification factor of the gain. Accordingly, the amplification factor of the high-frequency component is increased and the characteristic for advancing the phase is given.

The phase compensation will now be described. FIG. 8A is an example of the frequency characteristics of the DAC 108$b$. FIG. 8B is the frequency characteristics of the Vref supply circuit (reference voltage generating unit 108$a$), when the phase compensation circuit PP is connected in parallel. FIG. 8C is an example of the frequency characteristic when the DAC 108$b$ and the Vref supply circuit (reference voltage generating unit 108$a$) are combined.

As illustrated in FIG. 8C, in the high-frequency component, the amplification factor is increased and the phase is advanced because of the capacitor component of the phase compensation circuit PP. Here, constants of the resistance and the capacitor of the phase compensation circuit PP are set in advance, based on the response characteristics of the DAC 108$b$, as the frequency characteristic.

In this manner, the phase delay of the DAC can be compensated even when a DAC with slow response characteristics is used, by giving a frequency characteristic to a portion of supply circuit (reference voltage generating unit 108$a$) of the reference potentials VrefT(t) and VrefB(t) (see FIG. 8C).

An algorithm for calculating a DAC setting value in the present embodiment will now be described.

Detection of streaks in an image due to the effect of the SSCG will now be studied.

The streaks due to the effect of the SSCG appear, as described above, because when the SSCG is used as a countermeasure against the EMI, the offset level of the image, however slight, varies in a cycle in synchronization with the modulation cycle of the SSCG.

This is partly because, when the SSCG function is realized by using a general SSCG modulation function unit, the modulation frequency is often unknown. Accordingly, the cycle of one line and the cycle of the SSCG modulation in the image reading apparatus are generally out of synchronization.

As a feature amount of the streak image due to the effect of SSCG, the degree of effect of the SSCG can be expressed, by using a difference amount between the peak value and the bottom value of the distribution of the offset levels of the read analog image signals AV1 to AV$n$ in the main-scanning direction. This is because, the peak-bottom difference becomes zero if the variation due to the effect of SSCG does not occur, and the peak-bottom difference is increased as the variation due to the effect of the SSCG is increased.

Figure 9A:
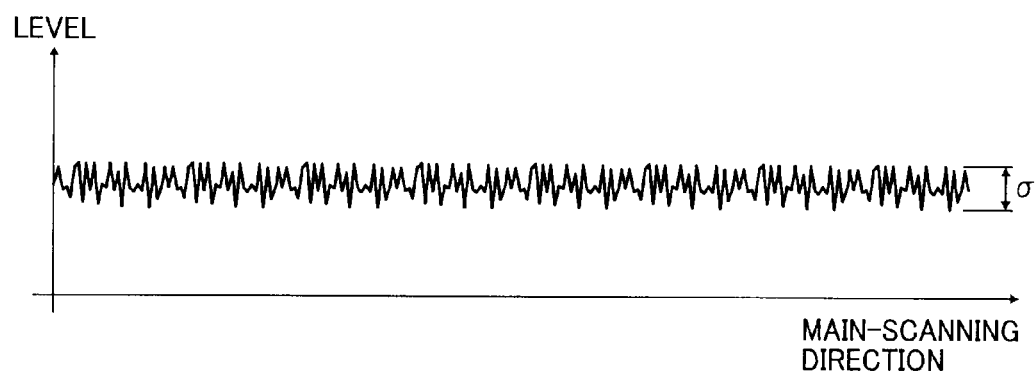
FIGS. 9A and 9B are waveform diagrams for explaining the property of a random noise component included in read analog image signals AV1 to AVn.
Figure 9B:
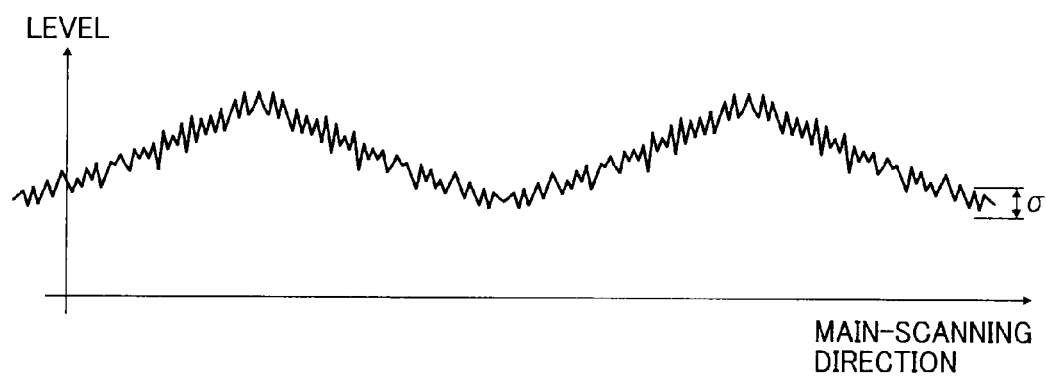

However, the read analog image signals AV1 to AV$n$ to be processed in the present embodiment are output from the CCD line image sensor 101, and include random noise. Because the peak-bottom difference has the feature amount including a random noise component, even if the variation due to the effect of the SSCG does not occur, a random noise component $\sigma$ is detected as a peak-bottom difference. FIG. 9A is a schematic when a value of the peak-bottom difference due to the effect of the SSCG is zero. FIG. 9B is a schematic when a value of the peak-bottom difference due to the effect of the SSCG is not zero.

In other words, even if the variation due to the effect of the SSCG does not occur, the variation of the signal level corresponding to the random noise component appears in the read analog image signals AV1 to AV$n$. Accordingly, unless the random noise component is reduced, the peak-bottom difference as a feature amount of the streak image due to the effect of the SSCG cannot be detected properly.

Figure 10A:
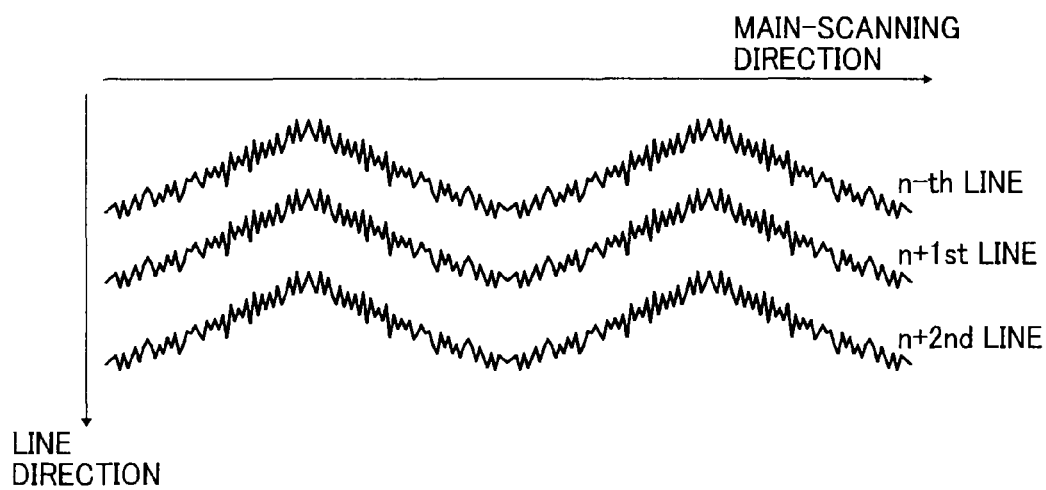
FIGS. 10A and 10B are waveform diagrams for explaining an example of a method for reducing the random noise component, while detecting a peak-bottom difference.
Figure 10B:
Figure 11A:
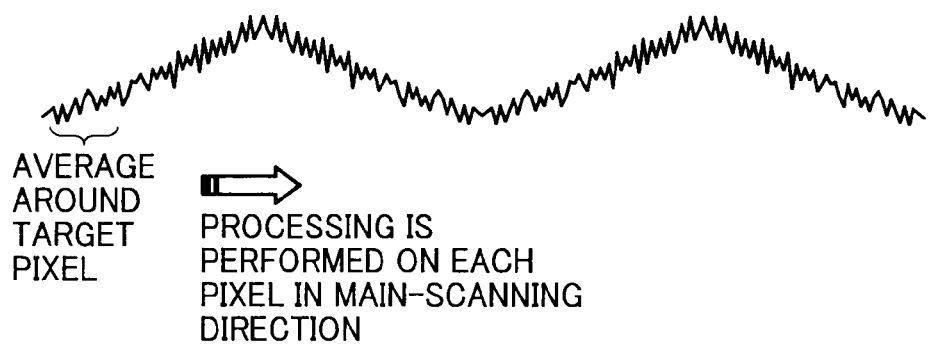
FIGS. 11A and 11B are waveform diagrams for explaining another example of a method for reducing the random noise component, while detecting a peak bottom difference.
Figure 11B:

As a method for detecting a peak-bottom difference in which a random noise component is reduced, as illustrated in FIGS. 10A and 10B, a period of scanning one line in the main-scanning direction is set to an integral multiple of the SSCG modulation cycle, and a peak-bottom difference is detected after averaging processing of a plurality of lines is performed on the pixels of the read signal. As another method for detecting a peak-bottom difference in which a random noise component is reduced, as illustrated in FIGS. 11A and 11B, there is a method for detecting a peak-bottom difference after applying a moving average on the pixels of the read signal in the main-scanning direction.

However, when the averaging processing is applied on the pixels of the read signal in a sub-scanning direction, as illustrated in FIGS. 10A and 10B, the operation time is disadvantageously increased because a large number of lines are required to reduce the noise. When a "peak value-bottom value" is detected from data to which a moving average is applied in the main-scanning direction, as illustrated in FIGS. 11A and 11B, the effect of reducing the random noise is small. Accordingly, the expected effect cannot be sufficiently obtained.

In the present embodiment, the modulation cycle of the SSCG modulation can be set arbitrarily in the SSCG function unit 107, and the effect of random noise can be effectively reduced with a small number of lines, by extracting the offset variation amount by using the modulation cycle setting value.

In other words, in the method for detecting a feature amount in the present embodiment, a peak-bottom difference of the SSCG variation is calculated as a feature amount, from an integral value of half the cycle and an integral value of one cycle of the SSCG modulation cycle, of the offset component of the read analog image signal AV. Accordingly, because the effect of the random noise can be reduced by a small number of lines, it is possible to improve the detection accuracy of the variation amount.

The method for detecting the feature amount will now be described with reference to FIGS. 12 and 13.

Figure 12:
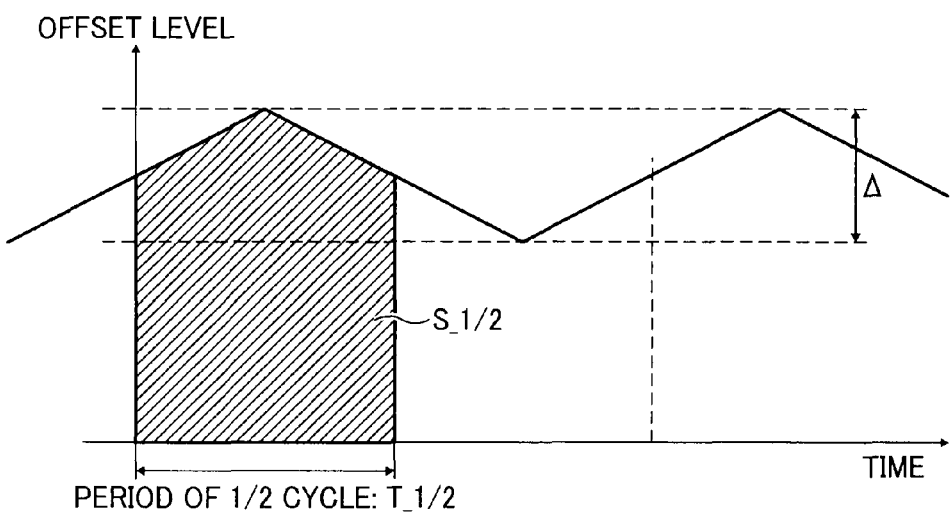
FIG. 12 is a schematic for explaining a method for detecting the peak-bottom difference used in the present embodiment.
Figure 13:
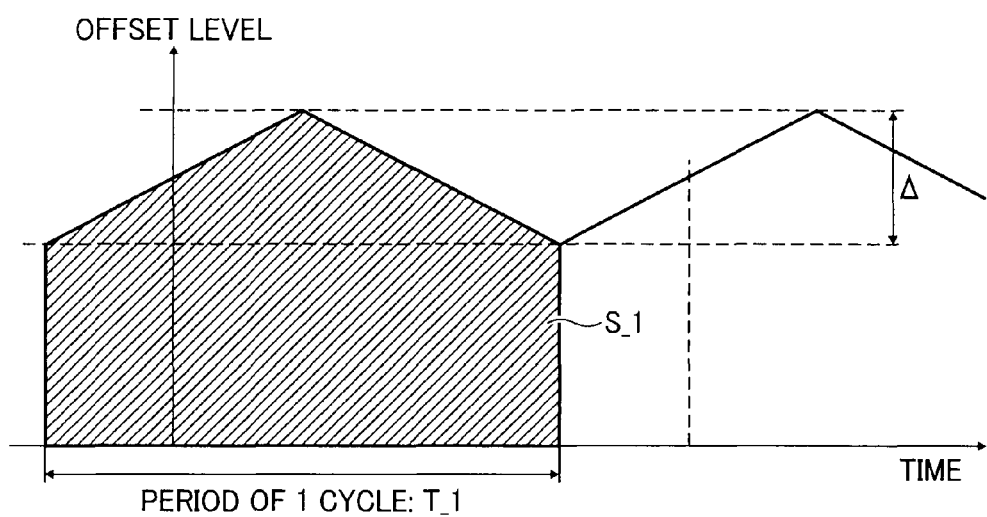
FIG. 13 is a schematic for explaining a method for detecting the peak-bottom difference used in the present embodiment.

The relation between a count value of the up-down counter 107a and an offset value of the read analog image signal AV is in a linear relation, and while the count value of the up-down counter 107a of the SSCG function unit 107 is in a positive region, the offset level of the read analog image signals AV (AV1 to AVn) vary, for example, as illustrated in FIGS. 12 and 13.

The shaded area illustrated in FIG. 12 is a half-cycle portion of the SSCG modulation cycle while the count value of the up-down counter 107a of the SSCG function unit 107 is in a positive region. The integral value of the read analog image signals AV during the period is expressed as S_1/2.

The shaded area illustrated in FIG. 13 is one cycle portion of the SSCG modulation cycle of the SSCG function unit 107, and the integral value of the read analog image signals AV during the period is expressed as S_1.

The peak-bottom difference of the variation amount of the read analog image signals AV due to the effect of the SSCG is $\Delta$, as illustrated in FIGS. 12 and 13, and the value can be calculated, from the areas (integral values) S_1/2 and S_1 calculated previously, as Equation (II):

$$\Delta = \{(2 \times S\_1/2 - S\_1) \times 4\}/T\_1 \qquad (II)$$

$\Delta$: peak bottom difference
T_1: time of one cycle of SSCG modulation

Equation (II) implies that a value obtained by subtracting an average value of the offset of the read analog image signals AV of one cycle of the SSCG modulation cycle from an average value of the offset of the read analog image signals AV while a count value of the up-down counter 107a of the SSCG function unit 107 is in a positive region, multiplied by four, is the peak-bottom difference of the offset variation amount of the read analog image signals AV due to the effect of the SSCG.

In this case, the average value can be obtained by dividing the integral value with a certain period of time. Accordingly, to reduce the effect of random noise, the integral value and the average value can obtain the same effects.

The integral value can be calculated during one cycle of the SSCG modulation cycle at the shortest. Accordingly, the calculation time required to detect the peak-bottom difference can also be reduced. The detection accuracy can be further improved by repeating the detection of the peak-bottom difference for a several cycles of the SSCG modulation cycle as needed, and calculating the average value.

By using the detection result, a DAC setting value of the DAC 108b for determining the correction signals HS1 to HSn can be obtained.

As described above, the system can appropriately set a value of the SSCG modulation cycle. Accordingly, the value of the SSCG modulation cycle is an appropriate value for the image reading apparatus according to the present embodiment.

The peak detecting unit 202_1 of the image processing unit (IPU) 202 detects the peak-bottom difference. Because the peak detecting unit 202_1 detects the peak-bottom difference based on the digital image signal DV, when the peak detecting unit 202_1 calculates Equation (II), the peak detecting unit 202_1 calculates the product of the digital image signals DV of the pixels of the corresponding cycle, instead of calculating the integral value S_1/2 of half the cycle and the integral value S_1 of one cycle of the SSCG modulation cycle. The peak detecting unit 202_1 then calculates Equation (II), by using the product.

To remove the effect of the SSCG modulation from the read signal as in the present invention, it is important to detect the relative size of the read analog image signal AV, than detecting the absolute value of the peak-bottom difference. Because the digital image signal DV is basically obtained by analog-digital converting of the read analog image signal AV, a value of the digital image signal DV includes a digital value corresponding to an analog value of the offset component and random noise component included in the read analog image signal AV. Accordingly, calculation of the peak-bottom difference of the digital image signal DV as described above is equivalent to detecting a relative value of the peak-bottom difference of the read analog image signal AV. Consequently, in the present embodiment, the peak-bottom value is detected based on the digital image signal DV, and the effect of the SSCG is removed based on the result. The specific structure will be described later.

An algorithm for calculating the DAC setting value will now be described.

As an algorithm for calculating the DAC setting value, for example, a DAC setting value obtained by detecting a peak-bottom difference while gradually updating the DAC setting value of the DAC 108b, until the peak-bottom difference eventually becomes minimal, or a DAC setting value in which the peak-bottom difference is equal to or less than a constant threshold level, may be set as a DAC setting value used as a correction signal.

However, if such an algorithm is used, the detection of the peak-bottom difference and the update of the DAC setting value of the DAC 108b need to be repeated, thereby requiring a long processing time. Because the peak-bottom difference is reduced as the DAC setting value of the DAC 108b is brought closer to an optimal value, the degree of effect of random noise component is increased. Accordingly, it is difficult to obtain an optimal value.

Consequently, as an algorithm for calculating the DAC setting value of the present embodiment, the following algorithm in which the number of detection times and effect of random noise are reduced, is used.

Figure 14A:
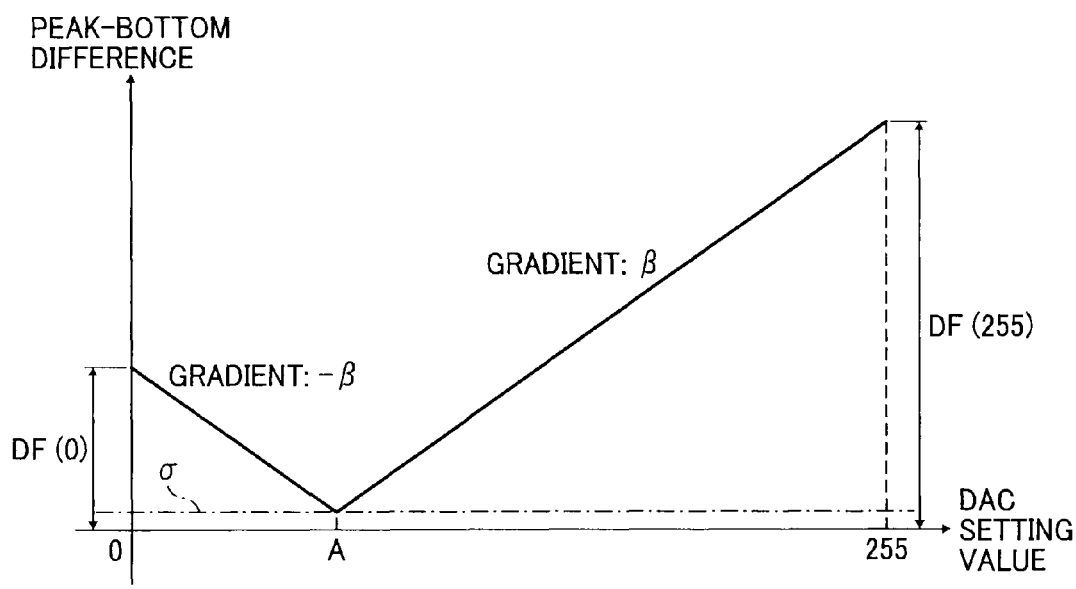
FIGS. 14A and 14B are schematics for explaining an algorithm for obtaining a DAC setting value.

In the structure of the present embodiment, FIG. 14A is a graph of a relation between the DAC setting value and the peak-bottom difference, while the correction signal is superimposed on image data varied due to the effect of the SSCG. For descriptive purposes, FIG. 14A is a graph when the DAC has a setting range of 8 bits.

In the graph, the peak-bottom difference is minimal at a setting value A. Accordingly, it is understood that the setting value A is the optimal value for a DAC setting value used to cancel the variation due to the effect of the SSCG.

In other words, as described above, because the relation between the DAC setting value of the DAC 108b and the output is in a linear relation, if the DAC setting value of the DAC 108b is increased from zero, the peak-bottom difference is reduced linearly by a gradient of $-\beta$ and increased by a gradient of $\beta$ before and after the setting value A. Because the peak-bottom difference is being detected, the peak-bottom difference is reduced and increased before and after the setting value A. However, the size of variation is constant at $\beta$.

Figure 14B:
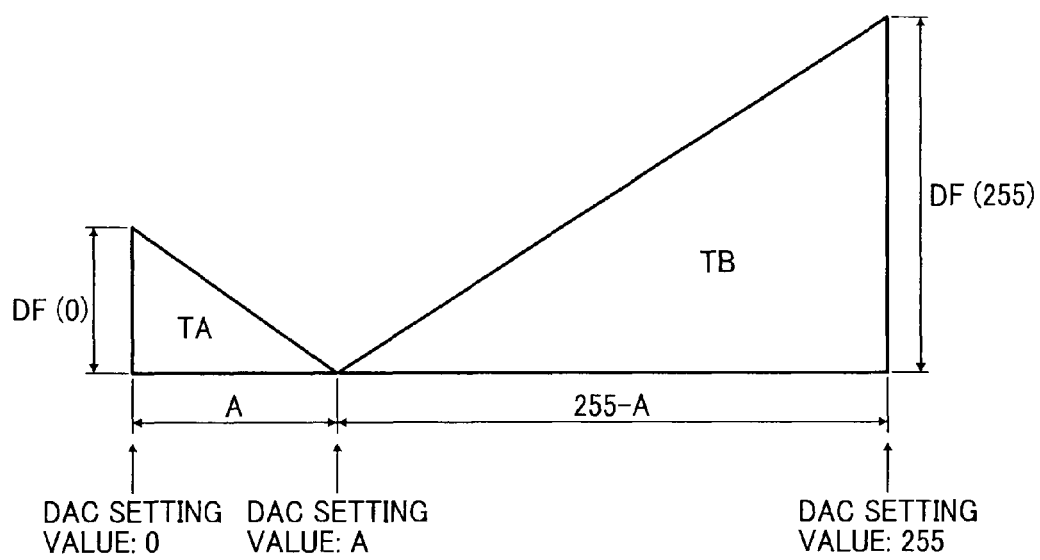

Upon viewing FIG. 14A graphically, as illustrated in FIG. 14B, the magnitudes of the gradients of a triangular TA formed at the left side of the setting value A and a triangular TB formed at the right side of the setting value A are both β. Accordingly, the triangular TA and the triangular TB are in a similar, or homologous relation.

Because the triangular TA and the triangular TB are similar, a value of the setting value A is calculated, from the ratio between a peak-bottom difference DF (0) (=Δ_0) at the setting value of 0, and a peak-bottom difference DF (255) (=Δ_255) at the setting value of 255, as Equation (III):

$$\text{setting value } A = 255 \times \Delta\_0/(\Delta\_0 + \Delta\_255) \quad \text{(III)}$$

In this case, the setting value A that is the optimal value for the DAC setting value is obtained by calculating Equation (III). Accordingly, there is no need to detect a peak-bottom difference while repeating the update of the DAC setting value of the DAC 108*b*, and the setting value A can be calculated by just detecting the peak-bottom difference twice, while the DAC setting value of the DAC 108*b* is being changed. Consequently, it is possible to obtain an optimal value for the DAC setting value at a very short time.

The peak-bottom difference: Δ_0 at the setting value of 0 and the peak bottom difference: Δ_255 at the setting value of 255 are both sufficiently large relative to the random noise component σ (see FIG. 14A). Accordingly, the optimal value for the DAC setting value is least affected by the random noise component σ.

In the description above, the peak-bottom difference: Δ_0 and the peak-bottom difference: Δ_255 detected at the setting value of 0 and the setting value of 255 are used. However, any setting values can be used as long as the effect of the random noise σ is small relative to the detection value of the peak-bottom difference.

Figure 15:
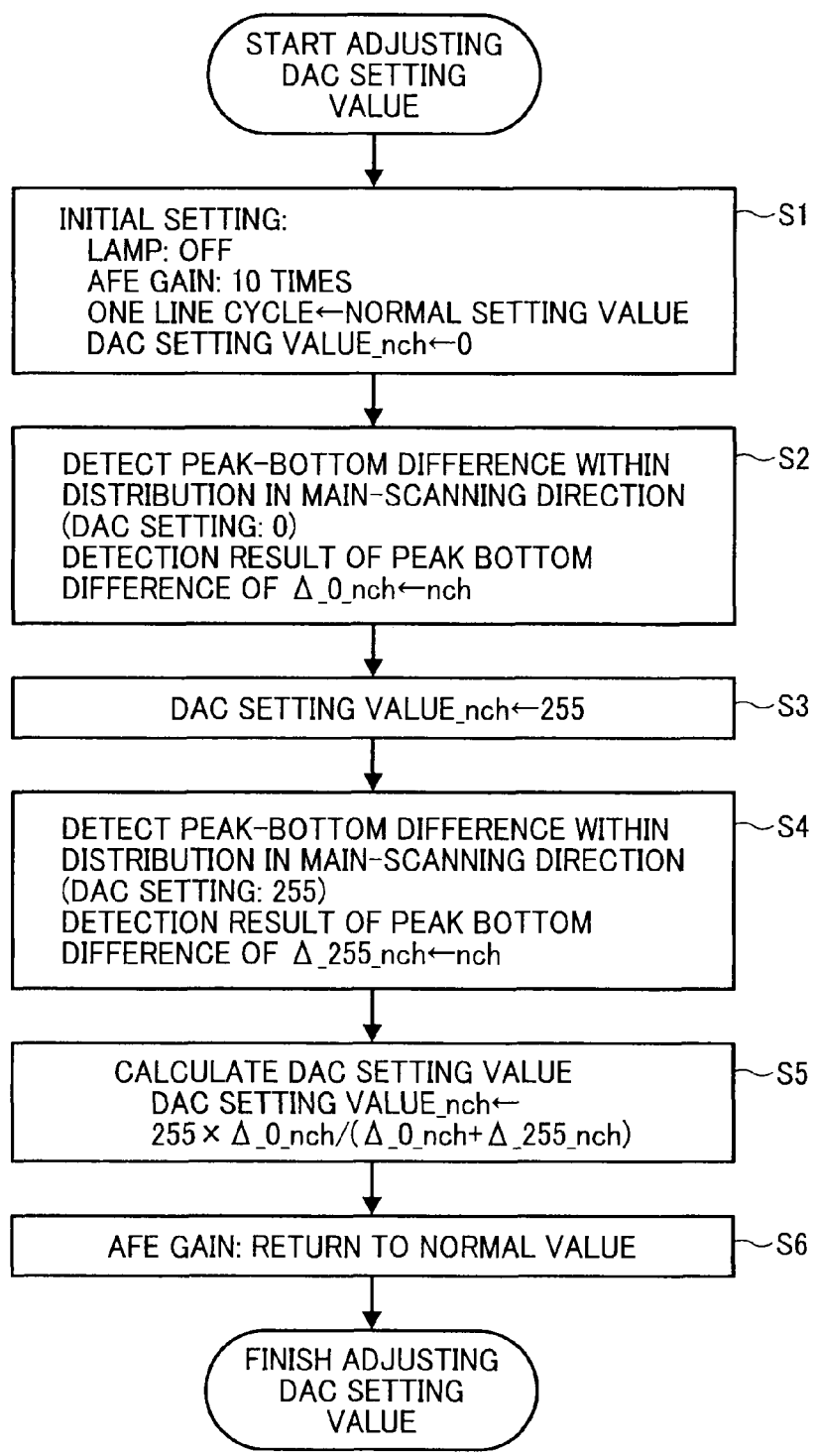
FIG. 15 is a flowchart of an example of an adjustment process of the DAC setting value.
Figure 16:
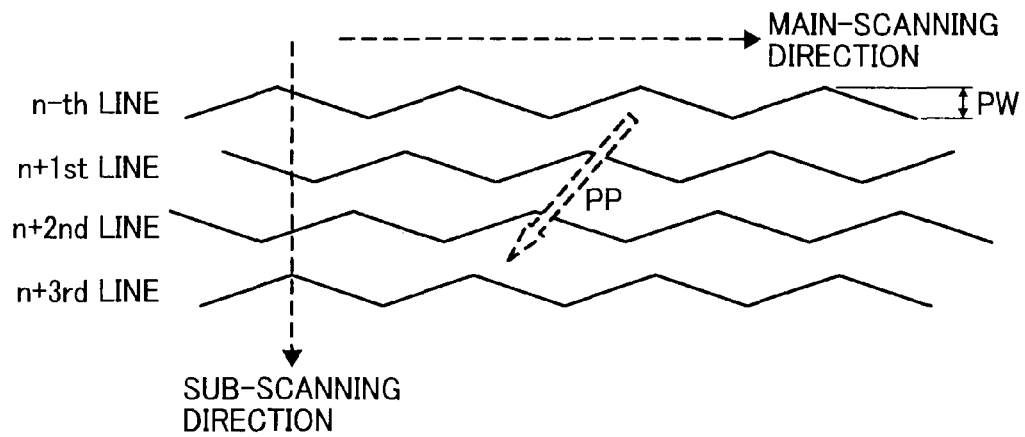
FIG. 16 is a schematic for explaining the effect of the SSCG on an image to be read.
Figure 17:
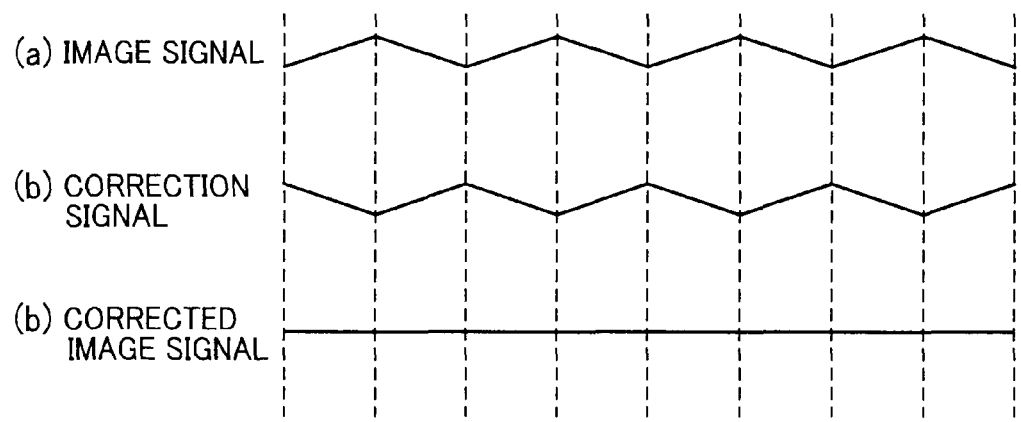
FIG. 17 is a schematic for explaining a method for improving the effect of the SSCG on the image to be read.

FIG. 15 is a flowchart of an example of a process when the CPU 203 of the substrate controlling unit 200 calculates a DAC setting value based on the algorithm described above.

In the process described with reference to FIG. 15, the DAC 108*b* performs 8-bit gradation, and uses 0 and 255 as setting values for calculation. The random noise reduction method is performed by the calculation method explained with reference to FIGS. 12 and 13 and Equation (II).

The initial setting is carried out at first, thereby setting variables and conditions (Step S1).

lamp←OFF
AFE gain←ten times
one line cycle←set to normal setting value
DAC setting value_nch←0
*Explanation of variables and constants lamp: to detect the offset variation due to the effect of the SSCG, the lamp is turned OFF, and the reading is carried out in the dark.

AFE gain: set to a state in which the amplification factor of the read analog image signal AV is increased by 10 times, thereby increasing the detection sensitivity.

DAC setting_nch: DAC setting value for nch of the DAC 108*b*. To set the correction signal, the adjustment starts from a state of zero.

After performing the initial setting, the peak detecting unit 202_1 detects a peak-bottom difference, by setting the DAC setting value to zero (Step S2). The peak-bottom difference is detected, as described above, by calculating the product of the pixels of the digital image signal DV for half the cycle of the SSCG modulation cycle (corresponds to the integral value S_1/2 in FIG. 12), and by calculating the product of the pixels of the digital image signal DV for one cycle of the SSCG modulation cycle (corresponds to the integral value S_1 in FIG. 13). A peak bottom difference Δ of the variation of the SSCG is obtained by calculating Equation (II), by assuming that the product of half the cycle and the product of one cycle are the integral value S_1/2 and the integral value S_1 in Equation (II) (the same applies in the following). Accordingly, the CPU 203 sets a period of half the cycle and a period of one cycle of the SSCG modulation cycle, while the peak detecting unit 202_1 is detecting a peak-bottom difference and the like.

The peak-bottom difference is then detected by setting the DAC setting value to 255 (Steps S3 and S4).

DAC setting value_nch←255

A peak-bottom difference detection process similar to that at Step S2 is also performed, when the DAC setting value of the DAC 108*b* is set to 255. Accordingly, a variable Δ_255_nch is obtained.

The DAC setting value of a correction signal is calculated from the detected peak-bottom differences: Δ_0_nch and Δ_255_nch (Step S5).

$$\text{DAC setting value} = 255 \times \Delta\_0\_nch/(\Delta\_0\_nch + \Delta\_255\_nch)$$

After setting the calculated DAC setting value to nch of the DAC 108*b*, the AFE gain changed during the initial setting is returned to a normal setting value, thereby finishing the process (Step S6).

By calculating the DAC setting value based on the DAC setting value calculation flowchart described above, it is possible to obtain the setting value A suitable for reducing the offset variation of the read analog image signal AV due to the effect of the SSCG. As a result, it is possible to reduce streaks that appear on an image.

The offset variation due to the effect of the SSCG is largely affected by the degree of device characteristics of the CCD line image sensor 101. Accordingly, the offset variation amount may be changed depending on the temperature characteristics and the like. Consequently, in an image reading apparatus using such the CCD line image sensor 101, the optimal value for the DAC setting value is set by using the DAC setting value calculation flowchart described above. As a result, even if the steaks on the image are reduced, because the offset variation amount due to the effect of the SSCG changes over the time, streaks due to the effect of the SSCG may appear again on the image.

Even in such an event, by providing a process of performing the DAC setting value calculation process described above at arbitrary time intervals in system processing, it is possible to correspond to the change of the offset variation amount due to the effect of the SSCG over the time.

For example, by providing a mode with which a continuous electrical connection time is monitored in an image reading apparatus including the functions of the present embodiment, and performing the DAC setting value calculation process described above at predetermined time intervals, the present embodiment can correspond to the change of the offset variation due to the effect of the SSCG over the time.

By including the image reading apparatus according to the present embodiment in an image forming apparatus, the image forming apparatus can form an image based on image information from which streaks due to the effect of the SSCG are reduced.

As described above, with this image reading apparatus, it is possible to reduce the streak image corresponding to the problem of streak image in an image of the reading apparatus using the SSCG.

By using the characteristics of the amplification unit that set the process of calculating a setting value by feeding back, it is possible to obtain a suitable setting value using an easy process.

By using the feature amount obtained by using the same image processing path as that of the normal image reading operation while generating a correction signal, it is possible to generate a correction signal without adding a structure for extracting the feature amount.

By providing a structure by which a correction signal can be set at arbitrary amplification factor and the inversion or the non-inversion of the phase can be arbitrarily set during the generation of a correction signal, it is possible to correct the offset variation due to the effect of the SSCG, even if the offset variations fluctuate among devices. By using a general DAC, the structure can be realized at a low cost.

By extracting an analog signal in synchronization with the modulation cycle of the SSCG from a PLL block built in the timing generator for generating a CCD drive signal, it is possible to extract an analog signal in synchronization with the modulation cycle of the SSCG, without newly providing a complicated circuit.

In an image reading apparatus using an analog ASIC in which the analog processing and the A/D conversion processing performed on an image signal are implemented in an integrated circuit, it is possible to reduce a streak image due to the effect of the SSCG.

When a correction signal generated for reducing streaks due to the effect of the SSCG is superimposed on the image signal, it is possible to reduce the streaks due to the effect of the SSCG without newly providing a complicated circuit, by superimposing the correction signal on a clamp potential of the ASIC for analog processing through an AC coupling.

Even if a streak image due to the effect of the SSCG changes over the time, it is possible to perform correction by adjusting the streak image separately from the other controls in the image reading apparatus.

It is also possible to provide an image forming apparatus including the image reading apparatus from which the streak effected by the SSCG is reduced.

A computer program of the DAC setting value calculation flow of the invention may be stored in a storage unit such as a read only memory (ROM), a hard disk drive (HDD), or a solid state drive (SSD) provided with the CPU 203 of the substrate controlling unit 200 from the very start. However, the computer program of the DAC setting value calculation flow may be provided by storing into a recording medium such as a compact disk-read only memory (CD-ROM), a flexible disk, a magneto optical (MO), a compact disk-recordable (CD-R), a compact disk-rewritable (CD-RW), a digital versatile disk plus recordable (DVD+R), a digital versatile disk plus rewritable (DVD+RW), a digital versatile disk-recordable (DVD-R), a digital versatile disk-rewritable (DVD-RW), or a digital versatile disk-random access memory (DVD-RAM). The computer program of the DAC setting value calculation flow may also be provided by storing into a non-volatile recording medium (memory) such as a static random access memory (SRAM), a non-volatile random access memory (NOV-RAM), an electrically erasable and programmable read only memory (EEPROM), and a memory card. The procedures described above can be executed, by installing the computer program recorded on the memory and causing the CPU 203 to execute the program, or causing the CPU 203 to read the computer program from the memory and execute the program.

The computer program can also be executed by downloading from external equipment connected to a network and including a recording medium in which the computer program is recorded, or from external equipment having a storage unit in which the computer program is stored.

The configurations of the embodiments and the modifications described above may be appropriately combined without contradiction and within the scope of the present invention.

In the image reading apparatus and the image forming apparatus of the invention as described above, even if offset variations due to the effect of the SSCG fluctuate among devices, it is possible to advantageously and properly correct the effect of the SSCG that appears in the image reading signal.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus that converts light reflected from an original into an analog image signal by a photoelectric conversion element, that converts the obtained analog image signal to which analog signal processing is applied into a digital image signal by an analog-digital converter, and that outputs the digital image signal, the image reading apparatus comprising:
   a frequency modulation unit that generates a clock whose frequency is modulated by an arbitrary modulation cycle relative to a reference clock;
   a modulation cycle setting unit that sets the modulation cycle;
   a driving unit that drives the photoelectric conversion element by the clock whose frequency is modulated;
   a signal generating unit that generates an analog signal corresponding to a frequency change of the clock whose frequency is modulated;
   an amplification inversion unit
      capable of amplifying an alternating current component of the analog signal with an amplification factor corresponding to a setting value set externally, and
      capable of switching between inversion and non-inversion;
   a signal superimposing unit that superimposes the analog image signal on an analog signal output from the amplification inversion unit; and
   a controlling unit
      that controls to convert the analog image signal on which the analog signal is superimposed by the signal superimposing unit into a digital image signal by the analog-digital converter,
      that calculates a feature amount appearing on the digital image signal based on the modulation cycle set by the modulation cycle setting unit, and
      that controls the amplification factor and the inversion or the non-inversion of the amplification inversion unit based on a calculation result.

2. The image reading apparatus according to claim 1, wherein
   a frequency of the reference clock after the frequency is modulated by the frequency modulation unit
      is increased at a constant speed during one half of the modulation cycle set by the modulation cycle setting unit, and
      is decreased at a constant speed during a remaining half of the modulation cycle.

3. The image reading apparatus according to claim 1, wherein
the frequency modulation unit includes
a counting unit that increases or decreases a count value corresponding to a timing of the reference clock,
the frequency modulation unit modulates frequency of the reference clock by a modulation amount corresponding to a count value made by the counting unit, and
the modulation cycle setting unit sets the modulation cycle by setting a reference count value wherein,
the counting unit switches an increase or an decrease in a count value based on a timing of the reference count value.

4. The image reading apparatus according to claim 3, wherein
the counting unit includes a polarity bit indicating positive or negative of a count value, and
the controlling unit calculates the feature amount based on
a value obtained by adding data of pixels of the digital image signal within a range in which a value of the polarity bit is in a predetermined value, and
a value obtained by adding data of pixels of the digital image signal within a range of one cycle of the frequency modulation.

5. The image reading apparatus according to claim 1, wherein in the amplification inversion unit, the setting value of the amplification factor specified externally and an amplification factor of an input signal have a linear relation.

6. The image reading apparatus according to claim 1, wherein
the amplification inversion unit includes
a reference signal generating unit that generates two analog signals having a same amplitude and reversed phases from the analog signal, and
a digital-analog converter by which the two analog signals generated by the reference signal generating unit are separately supplied to a reference voltage, and
by switching a digital value to be set in the digital-analog converter, the amplification factor and the inversion or the non-inversion are switched.

7. The image reading apparatus according to claim 6, wherein
the reference signal generating unit includes a circuit element having a frequency characteristic for further amplifying a high-frequency component of the analog signal.

8. The image reading apparatus according to claim 6, wherein
the photoelectric conversion element is divided into a plurality of channels,
the digital-analog converter included in the amplification inversion unit includes a plurality of output channels, and
the digital-analog converter is a general converter capable of setting a digital value to each of the channels through serial communication.

9. The image reading apparatus according to claim 1, wherein
the signal generating unit generates an analog signal corresponding to a frequency change of the clock whose frequency is modulated, by using an input signal to a voltage controlled oscillator (VCO) of a phase locked loop (PLL) circuit that receives the reference clock.

10. The image reading apparatus according to claim 1, wherein a unit that applies the analog signal processing on the analog image signal and the analog-digital converter are formed by a same application specific integrated circuit (ASIC) for analog processing.

11. The image reading apparatus according to claim 10, wherein
the signal superimposing unit superimposes the analog signal output from the amplification inversion unit on a clamp potential of the ASIC for analog processing.

12. The image reading apparatus according to claim 1, wherein the controlling unit is capable of adjusting a setting value for specifying the amplification factor and the inversion or the non-inversion to be set in the amplification inversion unit at an arbitrary timing.

13. An image forming apparatus comprising an image reading unit that is the image reading apparatus according to claim 1.

14. An image reading apparatus that converts light reflected from an original into an analog image signal by a photoelectric conversion element, that converts the obtained analog image signal to which analog signal processing is applied into a digital image signal by an analog-digital converter, and that outputs the digital image signal, the image reading apparatus comprising:
means for generating a clock whose frequency is modulated by an arbitrary modulation cycle relative to a reference clock;
means for setting the modulation cycle;
means for driving the photoelectric conversion element by the clock whose frequency is modulated;
means for generating an analog signal corresponding to a frequency change of the clock whose frequency is modulated;
means for being
capable of amplifying an alternating current component of the analog signal with an amplification factor corresponding to a setting value set externally, and
capable of switching between inversion and non-inversion;
means for superimposing the analog image signal on an analog signal output from the amplification inversion unit; and
means for
controlling to convert the analog image signal on which the analog signal is superimposed by the signal superimposing unit into a digital image signal by the analog-digital converter,
calculating a feature amount appearing on the digital image signal based on the modulation cycle set by the modulation cycle setting unit, and
controlling the amplification factor and the inversion or the non-inversion of the amplification inversion unit based on a calculation result.

* * * * *